No. 845,501. PATENTED FEB. 26, 1907.
F. W. WOLF.
VEHICLE CANOPY.
APPLICATION FILED OCT. 22, 1906.

2 SHEETS—SHEET 1.

Witnesses:
O.W. Gardner
L. Sussman

Inventor:
Frank W. Wolf
By his Attorney
Geo. W. Miatt

No. 845,501.  
PATENTED FEB. 26, 1907.
F. W. WOLF.  
VEHICLE CANOPY.  
APPLICATION FILED OCT. 22, 1906.
2 SHEETS—SHEET 2.
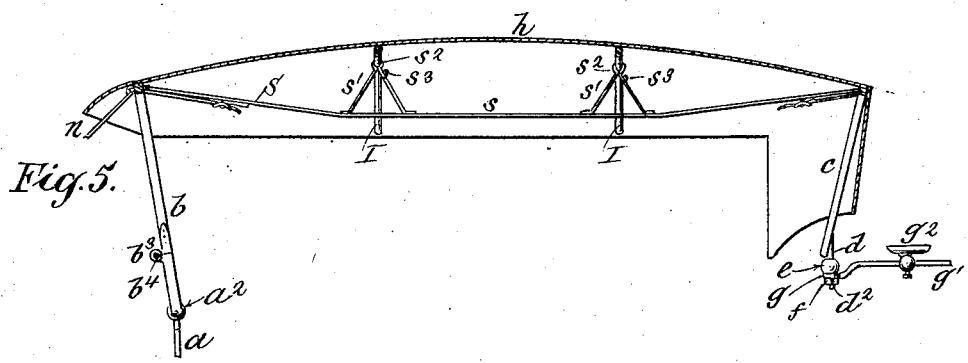
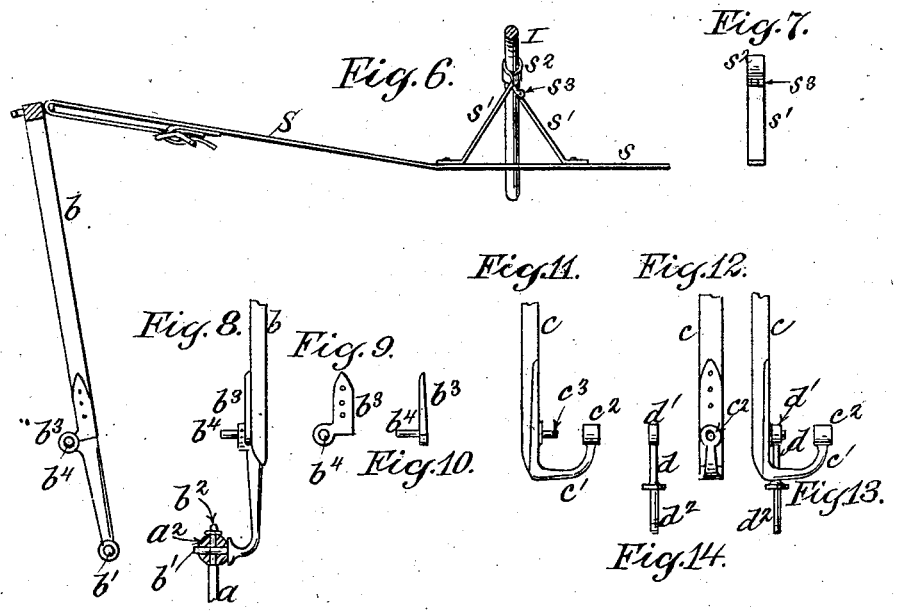
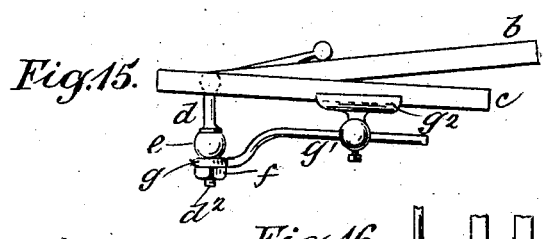
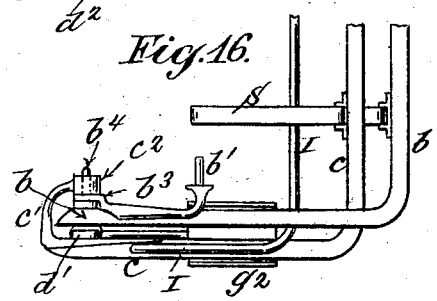
Witnesses:  
D. W. Gardner.  
L. Sussman.
Inventor:  
Frank W. Wolf  
By his Attorney  
Geo. W. Miatt

UNITED STATES PATENT OFFICE.

FRANK W. WOLF, OF ORANGE, NEW JERSEY.

VEHICLE-CANOPY.

No. 845,501.     Specification of Letters Patent.     Patented Feb. 26, 1907.

Application filed October 22, 1906. Serial No. 339,925.

*To all whom it may concern:*

Be it known that I, FRANK W. WOLF, a citizen of the United States, residing at Orange, Essex county, and State of New Jersey, have invented certain new and useful Improvements in Vehicle-Canopies, of which the following is a specification.

My improvements, while applicable to tops or canopies for vehicles generally, are designed more particularly for automobiles and similar vehicles of comparatively greater length than breadth where a folding awning is desirable.

The object is to afford a light-weight awning or canopy of simple but substantial structure which will afford the least possible obstruction when in use and which may be quickly and conveniently folded and stored temporarily behind the vehicle or as readily replaced, as may be desired.

The distinguishing feature of the invention consists, essentially, in supporting the flexible cloth covering upon suspension-trusses between front and rear bows attached, respectively, to the dashboard and to the back of the vehicle, substantially as hereinafter set forth.

Incidentally the invention includes certain other specific features in the construction and arrangement of parts herein shown and described.

Figure 1:
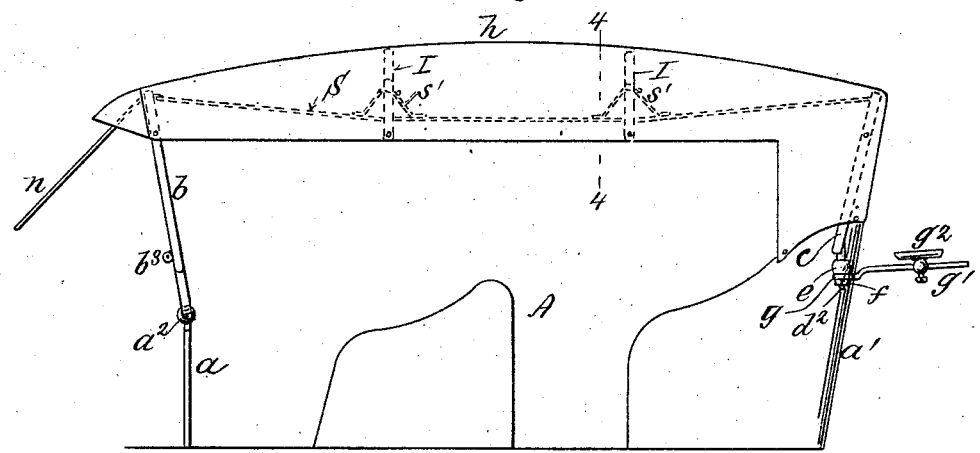
Figure 2:
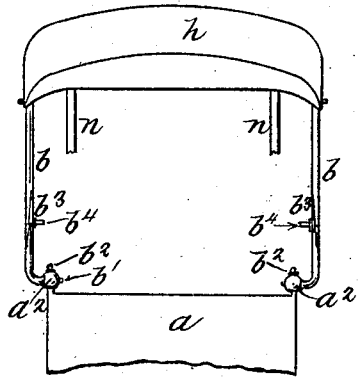
Figure 3:
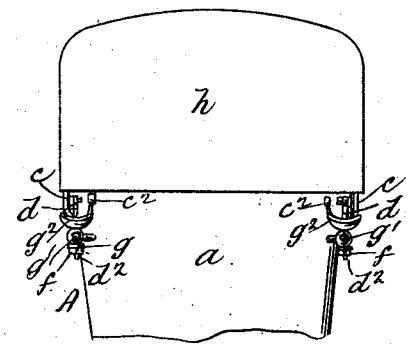
Figure 4:
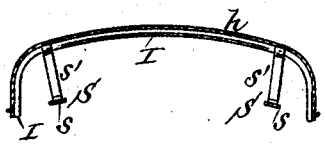

In the accompanying drawings, Figure 1 is a side elevation of my improved canopy as applied to the superstructure of an automobile, the latter being indicated diagrammatically. Fig. 2 is a front elevation, and Fig. 3 a rear elevation, of the same. Fig. 4 is a transverse section upon plane of line 4 4, Fig. 1; Fig. 5, a central vertical longitudinal view of the canopy, showing one of the suspension-trusses in elevation. Fig. 6 is a sectional detail, on a larger scale, of the front bow and forward portion of one of the suspension-trusses; Fig. 7, an edge view of one of the braces; Fig. 8, an elevation of one of the ends of the front bow with the receiving-socket on the dashboard in section; Figs. 9 and 10, detail views of one of the pintlet-plates used on the front bow. Fig. 11 is an elevation of one of the ends of the rear bow; Fig. 12, a view taken at right angles to Fig. 11; Fig. 13, a view similar to Fig. 11, showing the connection with a standard; Fig. 14, an elevation of one of the standards upon which the rear bow is mounted. Fig. 15 is a side elevation of one of the socket-pieces and connections for the rear bow, showing both front and rear bows supported thereon, the cloth covering being omitted; Fig. 16, a top view of the parts shown in Fig. 15.

In the drawings, A represents the superstructure or body of an automobile or other vehicle, $a$ being the dashboard and $a'$ being what we will herein designate for convenience as the "rear" or "backboard" of the carriage-body.

$b$ is the front bow, the lower ends of which are supported upon the dashboard $a$ in any suitable or well-known manner, as by the engagement of a stud $b'$ on each end of the bow with the usual socket-piece $a^2$ on the dashboard $a$, the parts being held in engagement by a coupling-pin $b^2$, as will be understood by reference to Fig. 8. Each front-bow standard or upright is preferably, though not necessarily, made in two parts pivotally connected, as by hinges $b^3$, for the purpose of folding into more compact form when the canopy is dismounted and stored temporarily at the back of the vehicle, as hereinafter more fully set forth. I do not limit myself in this respect, however, since the front bow $b$ may be of ordinary construction without hinged sections, which are not essential in so far as the other features of my invention are concerned, the main function of the front bow $b$ being to afford a substantial support for the front ends of the suspender-trusses S S. The rear side of the suspender-trusses S S are in like manner supported by a rear bow $c$, which is of ordinary construction, except that each end is formed with a lateral extension $c'$, having an eye $c^2$ for the temporary reception of pintlet $b^4$ of one of the hinges $b^3$ of the front bow $b$ when the latter is made in hinged sections, as above stated. When the front bow is made without the folding end sections, pintlets $b^4$ or their equivalent in the form of studs are provided on each limb of the bow for thus engaging with the eyes $c^2$ on the lateral extensions $c'$ of the rear bow $c$, the object being to afford a means of coupling the front and rear bows together temporarily when the awning is folded and supported at the back of the vehicle.

Each end of the rear bow $c$ is formed with the usual lateral stud $c^3$ for engagement with the eye $d'$ in the upper end of a short standard $d$, (see Figs. 11, 13, and 14 ) the lower end $d^2$ of which fits in the usual socket-piece $e$, one of which is attached to each side of the backboard $a'$ of the vehicle-body. The lower end $d^2$ of each standard $d$ is threaded for the reception of a retaining-nut $f$, and between the latter and the socket-piece $e$ is interposed the eye $g$ of a bracket $g'$, to which is secured an adjustable shelf $g^2$ for the support of the front and rear bows and awning-cloth when the canopy is folded up. This is illustrated in Figs. 15 and 16, in which, however, the flexible awning-cloth is omitted, as it would otherwise obscure and hide the parts and their relation to each other when folded. The shelves $g^2$ are made adjustable upon the brackets $g'$, so as to afford an accurate counterpoise for the framework when resting thereon. When the front bow $b$ is unshipped and the canopy folded, the pintlets or studs $b^4$, are sprung into the eyes $c^2$, on the lateral extensions $c'$ of the rear bow $c$, and as the latter is still coupled by its standards $d$ to the socket-pieces $e$ it is obvious that the bows are thus locked together and held against displacement with the canopy and suspending-trusses between them, the shelves supporting the weight and preventing undue strain upon the connections.

Each truss S consists of a longitudinal suspender-strap $s$ and one or more braces $s'$, secured thereto and to one or more intermediate cross-bows I, the latter being relatively short as compared with the front and rear bows $b$ and $c$ and corresponding to the arched portions of said bows without their straight extensions or limbs by which they are secured to the vehicle-body. The opposite ends of the straps $s$ are secured in any suitable manner to the front and end bows $b$ and $c$, as by passing the ends of the strap around the bows or through loops attached thereto, as shown in the drawings, the overlapping ends of the strap being buckled together, as will be understood by reference more particularly to Fig. 6. The braces $s'$ are secured to the flexible straps $s$ and constitute holders or supports for the intermediate cross-bows I, one, two, or more of which may be used, according to the length of the canopy, as may be found most expedient. These bow-holding braces $s'$ may obviously be made in various ways with like result. As shown in the drawings, each consists of an inverted-V-shaped metal strip the ends or feet of which are riveted or otherwise secured to the longitudinal straps $s$, a loop $s^2$ being formed at the apex which clasps the intermediate cross-bow I, which is rigidly secured to the brace by any suitable means. In order to render the braces $s'$ collapsible when the canopy is folded, I hinge one section or limb of each brace to the other, as at $s^3$. Two or more of these longitudinal trusses S may be provided for the support of the flexible covering or awning-cloth $h$. In the drawings I have shown two, as will be understood by reference to Fig. 4, in which it will be seen that a suspender-truss S is provided at each side of the canopy. A third or middle one might obviously be added or any number used, if desired, on account of exceptional size of canopy or to give special strength thereto; but as one of the main objects of my invention is to attain a light-weight structure I prefer ordinarily to use only two suspender-trusses S, as herein illustrated.

$n$ represents one of the usual front stays by which the front bow $b$ is connected with the front of the vehicle, as an automobile.

It will be seen that a clear space is left on either side of the vehicle, particularly around the front seat, so that the movements and the vision of the driver are practically free and unobstructed. By disposing with the numerous groups of converging bows heretofore used I also add materially to the comfort and convenience of the occupants of the vehicle and at the same time materially reduce the weight of the structure as a whole, a consideration of considerable practical importance in automobiles and the like.

My improved folding canopy is not only much lighter but it also folds into a much smaller space than any of the older forms.

Owing to my peculiar construction of canopy and the nature of its connection with the vehicle-body, I am enabled to store and support it when folded completely behind the rear seat entirely out of the way, whereas heretofore the canopies when folded have necessarily overlapped more or less the back of the rear seat, obstructing the view and interfering with the comfort of the occupants.

What I claim as my invention, and desire to secure by Letters Patent, is—

1. In a folding canopy for vehicles of the character designated, the combination with the flexible covering and front and rear bows, of a longitudinal suspension-truss consisting of a flexible strap attached to said front and rear bows, one or more braces attached to said flexible strap, and one or more intermediate bows attached to said brace or braces, for the purpose described.

2. In a folding canopy for vehicles of the character designated, the combination with the flexible covering and front and rear bows, of a plurality of longitudinal suspension-trusses each consisting of a flexible strap attached to said front and rear bows, braces attached to said flexible straps, and one or more intermediate bows attached to said braces, for the purpose described.

3. In a folding canopy for vehicles of the character designated, the combination with the flexible covering and front and rear bows, of a plurality of longitudinal suspender-trusses each consisting of a flexible strap attached to said front and rear bows, inverted-V-shaped braces attached to said straps, and intermediate bows attached to said braces, for the purpose described.

4. In a folding canopy for vehicles of the character designated, the combination with the flexible covering and front and rear bows, of a plurality of longitudinal suspender-trusses, each consisting of a flexible strap attached to said front and rear bows, inverted-V-shaped braces attached to said straps, the arms of each brace being hinged together, and intermediate bows attached to said braces, for the purpose described.

5. In a folding canopy for vehicles of the character designated, the combination with the flexible covering and front and rear bows, of a plurality of longitudinal suspender-trusses each consisting of a flexible strap attached to said front and rear bows, inverted-V-shaped braces attached to said straps and each formed with a loop at its apex, and intermediate bows fitting in said loops and attached to said braces, for the purpose described.

6. In a folding canopy for vehicles of the character designated, the combination with the flexible covering and front and rear bows, of a plurality of longitudinal suspender-trusses each consisting of a flexible strap attached to said front and rear bows, inverted-V-shaped braces attached to said straps and each formed with a loop at its apex and with a hinge attaching one limb of the brace to the other, and intermediate bows fitting in said loops and attached to said braces, for the purpose described.

7. In a folding canopy for vehicles of the character designated, the combination of the flexible covering, a front bow having hinged sections, a rear bow, longitudinal suspension-trusses, consisting of flexible straps attached to said front and rear bows, braces attached to said straps, and intermediate bows attached to said braces, for the purpose described.

8. In a folding canopy for vehicles of the character designated, the combination of the flexible covering, a front bow formed with a laterally-projecting stud on each of its end extensions, a rear bow formed with lateral extensions having eyes for the reception of said studs on the front bow, longitudinal trusses consisting of flexible straps attached to said front and rear bows, braces attached to said straps, and intermediate bows attached to said braces, for the purpose described.

9. In a folding canopy for vehicles of the character designated, the combination with the flexible covering, front and rear bows, longitudinal trusses consisting of flexible straps attached to said front and rear bows, braces attached to said straps, and intermediate bows attached to said braces, of rear brackets and adjustable shelves thereon, for the support of the canopy when folded.

10. In a folding canopy for vehicles of the character designated, the combination with the covering and with the front and rear bows, of flexible longitudinal straps attached to the front and rear bows, folding braces attached to said straps, and intermediate bows attached to said braces, for the purpose described.

FRANK W. WOLF.

Witnesses:
   GEO. WM. MIATT,
   D. W. GARDNER.